3,792,172
ARTIFICIAL FEED FOR WILD SILKWORMS
Minoru Shirota, Tetsuo Fukada, and Mayumi Ogata, Kyoto, Toshiaki Takahashi, Nishinomiya, and Hiromi Yamada, Uji, Japan, assignors to Kabushiki Kaisha Yakult Honsha, Tokyo, and Hiromi Yamada, City of Uji, Japan
No Drawing. Filed Dec. 27, 1971, Ser. No. 212,538
Claims priority, application Japan, Dec. 25, 1970, 45/117,858
Int. Cl. A23k 1/18
U.S. Cl. 426—72      1 Claim

ABSTRACT OF THE DISCLOSURE

Artificial feeds for wild silkworms consisting of the conventional artificial feed containing leaves willingly taken by them and the unicellular green algae such as chlorella or scenedesmus.

CROSS REFERENCE TO RELATED APPLICATION

This application relates in subject matter to copending U.S. application Ser. No. 211,035 filed on Dec. 22, 1971, by M. Shirota et al. and assigned to the assignee of the present application.

BACKGROUND OF THE INVENTION

This invention relates to artificial feed compositions for rearing wild silkworms.

The term "wild silkworm" generally means those silkworms that spin cocoons from which silk filaments are reeled off and involves larval or caterpillars of moths named "Chinese tusser" (*Antheraea pernyl*), "Japanese tusser" (*Antheraea yamamai*), "eri silkmoth" (*Philosamia cynthia*) etc. The silk filaments resulting from the wild silkworms are utilized to form textiles, as are those formed from domestic silkworms or caterpillars of a silkmoth (*Bombyx mori*).

Unlike domestic silkworms, most of those wild silkworms are directly raised on trees in the open air. Recently, it has been attempted to rear such wild silkworms indoors with artificial feeds, and there have been already proposed various types of artificial feed compositions for that purpose as do the artificial feeds for domestic silkworms.

However the different types of wild silkworms live on leaves of different types of trees. More specifically, for Chinese and Japanese tussers leaves of one type of Japanese oak (*Quercus acutissima*) or another type thereof (*Quercus serrata*) in the form of a dried powder are blended with suitable feed materials to produce an artificial feed composition. For eri silkworms, leaves of a castor bean plant (*Ricinus communis*) or a tree of heaven (*Ailanthus altissima*) forms similarly a part of the artificial feed composition. Since eatables for wild silkworms can be selected over a range far broader than with the case of domestic silkworms, the wild silkworms can relatively easily be reared through the use of artificial feeds. Also it is possible to rear the wild silkworms with any artificial feed having a decreased content of leaves of the tree, or not containing any such leaves.

One of known artificial feeds for Chinese tussers (*Antheraea pernyi*) has a composition including 5.0 grams of leaves of a Japanese oak (*Quercus actissima*) in the form of a dried powder, 2.5 grams of a powder of exoleated soybean, 0.5 gram of starch, 1.0 grams of cane sugar and 0.1 gram of vitamin C. For eri silkworms (*Philosamia cynthia*), there is typically known an artificial feed composition including 5.0 grams of leaves of a tree of heaven (*Ailanthus altissima*) in the form of a dried 3.0 grams of a powder of exoleated soybean, 1.0 gram of cane sugar and 0.2 gram of vitanim C. Each of these two feed compositions can be mixed with 30 milliliters of a 2% agar solution to prepare an artificial feed for the particular wild silkworms. If desired, such a feed composition may be added to a mixture of vitamin B's, sterols, minerals and/or antiseptics.

In certain cases, wild silkworms may be more valuable than domestic silkworms by a factor of two or more, in view of the economical standpoint, but the cocoon crop resulting from the wild silkworms has been heretofore restricted to some extent because those host plants therefor are difficult to be cultured and the available types of such host plants are limited.

SUMMARY OF THE INVENTION

Accordingly, it is an object of the invention to provide an improved artificial feed composition for wild silkworms capable of increasing the cocoon crop.

The invention accomplishes this object by the provision of an artificial feed composition for wild silkworms consisting essentially of an artificial feed per se well known and a unicellular green algae belonging to chlorococcales.

The unicellular green algae may preferably be a chlorella or scenedesmus.

DESCRIPTION OF THE PREFERRED EMBODIMENTS

The above cited copending application Ser. No. 211,035 discloses artificial feed compositions for domestic silkworms containing unicellular green algae such as chlorellas or scenedesmuses. Numerous experiments have been conducted with the unicellular green algae added to conventional artificial feeds for wild silkworms. Their results have indicated that the unicellular green algae are also effective for artificially rearing wild silkworms. Before the invention it has never been attempted to add the unicellular green algae to artificial feeds for wild silkworms.

The following examples illustrate the practice of the invention.

EXAMPLE I

Two parts by weight of a chlorella were mixed with 8 parts by weight of the conventional artificial feed composition for eri silkworms (*Philosamia cynthia*) as above described. The resulting mixture was added to 30 parts by weight of a 2% agar solution to prepare a feed therefor. Also for control purposes, 10 parts by weight of the same artificial feed composition for the eri silkworms as above described were added to 30 parts by weight of a 2% agar solution to prepare an artificial feed.

The results of eri silkworms rearing are listed in the following Table I:

TABLE I

| | Invention | Prior art |
|---|---|---|
| Larval period, days | 20 | 24 |
| Yield of cocoon, percent | 95 | 87 |
| Cocoon weight, grams | 2.18 | 1.91 |
| Cocoon shell weight, gram | 0.23 | 0.18 |

From the Table I it can be seen that the invention causes eri silkworms to be grown rapidly, healthly and uniformly leading to an increase in yield of silk filaments.

EXAMPLE II

Chinese tussers were reared with an artificial feed composed of 7 parts by weight of the conventional artificial feed composition therefor as above described, 3 parts by weight of a chlorella and 30 parts by weight of a 2% agar solution. Also a control feed was formed of 10 parts by weight of the same feed composition as just described and 30 parts by weight of a 2% agar solution.

The results of the culture are listed in the following Table II.

TABLE II

|  | Invention | Prior art |
|---|---|---|
| Larval period, days | 26 | 30 |
| Percentage survival | 96 | 84 |
| Yield of cocoons, percent | 92 | 78 |
| Cocoon shell weight, gram | 0.45 | 0.33 |

The above Table II offers proof that the invention is also effective for rearing Chinese tussers whose moth is *Antheraea pernyi*.

From the foregoing it will be appreciated that the object of the invention has been accomplished by the addition of a unicellular green algae such as chlorella or scenedesmus to conventional artificial feeds for wild silkworms. Therefore the invention permits the indoor culture of wild silkworms thereby to increase the cocoon crop with natural host plants therefor saved.

What we claim is:

1. An artificial feed composition for rearing wild silkworms, consisting essentially of leaves upon which the silkworms feed, and being selected from the group consisting of Japanese oak leaves, castor bean plant leaves and tree of heaven leaves, 46–78% chlorella, 50–60% exoleated and powdered soybean, 20% sugar, 0–10% starch and 2–4% vitamin C, based on the weight of the leaves.

References Cited

UNITED STATES PATENTS

| 3,328,170 | 6/1967 | Y. Hamamura et al. | 119—6 |
| 3,488,196 | 1/1970 | M. Niimura et al. | 99—2 |
| 3,230,930 | 1/1966 | Y. Hamamura et al. | 119—6 |

FOREIGN PATENTS

| 45/1,095 | 4/1970 | Japan | 99—2 R |
| 45/5,015 | 2/1970 | Japan | 99—2 R |
| 45/2,050 | 1/1970 | Japan | 99—2 R |

OTHER REFERENCES

S. Arakawa et al., Chemical Abstracts, vol. 65, 1962, artical 17157 F.

V. Lautner, Chemical Abstracts, vol. 66, 1967, 17427e.

E. Kofranyi, Chemical Abstracts, vol. 72, 1970, 87667f.

N. Wai, Chemical Abstracts, vol. 52, 1957, 2192c.

NORMAN YUDKOFF, Primary Examiner

C. P. RIBANDO, Assistant Examiner

U.S. Cl. X.R.

119—6; 426—210